US008972267B2

(12) United States Patent
Yeh et al.

(10) Patent No.: US 8,972,267 B2
(45) Date of Patent: Mar. 3, 2015

(54) CONTROLLING AUDIO VIDEO DISPLAY DEVICE (AVDD) TUNING USING CHANNEL NAME

(75) Inventors: Sabrina Tai-Chen Yeh, Laguna Beach, CA (US); David Young, San Diego, CA (US); Steven Friedlander, San Diego, CA (US)

(73) Assignee: Sony Corporation, Tokyo (JP)

( * ) Notice: Subject to any disclaimer, the term of this patent is extended or adjusted under 35 U.S.C. 154(b) by 914 days.

(21) Appl. No.: 13/155,516

(22) Filed: Jun. 8, 2011

(65) Prior Publication Data

US 2012/0259639 A1  Oct. 11, 2012

Related U.S. Application Data

(60) Provisional application No. 61/473,098, filed on Apr. 7, 2011.

(51) Int. Cl.
| | | |
|---|---|---|
| *G10L 25/00* | (2013.01) | |
| *G10L 21/00* | (2013.01) | |
| *H04N 5/44* | (2011.01) | |
| *H04N 21/431* | (2011.01) | |
| *H04N 21/482* | (2011.01) | |
| *G06F 3/01* | (2006.01) | |

(52) U.S. Cl.
CPC ......... *H04N 5/4403* (2013.01); *H04N 21/4314* (2013.01); *H04N 21/482* (2013.01); *G06F 3/017* (2013.01)
USPC .......................... 704/275; 704/270; 704/270.1

(58) Field of Classification Search
CPC ............ H04N 21/4314; H04N 5/4403; H04N 21/482; H03J 9/00; H04H 60/72; G10L 15/22
USPC .................................................. 704/270–275
See application file for complete search history.

(56) References Cited

U.S. PATENT DOCUMENTS

| | | | | |
|---|---|---|---|---|
| 4,887,212 | A * | 12/1989 | Zamora et al. ..................... 704/8 |
| 5,479,488 | A * | 12/1995 | Lennig et al. ............... 379/88.04 |
| 5,544,654 | A * | 8/1996 | Murphy et al. ............... 600/443 |
| 5,577,164 | A * | 11/1996 | Kaneko et al. ................ 704/275 |
| 5,692,225 | A * | 11/1997 | Bernardi et al. ............. 396/318 |
| 5,774,859 | A * | 6/1998 | Houser et al. ................ 704/275 |
| 6,397,186 | B1 * | 5/2002 | Bush et al. .................... 704/274 |
| 7,447,635 | B1 * | 11/2008 | Konopka et al. ............ 704/275 |
| 2002/0002465 | A1 * | 1/2002 | Maes ........................... 704/275 |
| 2002/0091713 | A1 * | 7/2002 | Walker ........................ 707/200 |
| 2003/0028382 | A1 * | 2/2003 | Chambers et al. ........... 704/275 |
| 2003/0088399 | A1 * | 5/2003 | Kusumoto ..................... 704/10 |
| 2003/0144845 | A1 * | 7/2003 | Lee .............................. 704/275 |
| 2003/0149561 | A1 * | 8/2003 | Zhou ........................... 704/240 |
| 2004/0172256 | A1 * | 9/2004 | Yokoi et al. .................. 704/275 |
| 2004/0193426 | A1 * | 9/2004 | Maddux et al. .............. 704/275 |
| 2004/0254791 | A1 * | 12/2004 | Coifman et al. ............. 704/246 |
| 2005/0288927 | A1 * | 12/2005 | Kim et al. .................... 704/235 |
| 2006/0100871 | A1 * | 5/2006 | Choi et al. ................... 704/254 |
| 2006/0143017 | A1 * | 6/2006 | Sonoura et al. .............. 704/275 |
| 2006/0167696 | A1 * | 7/2006 | Chaar et al. ................. 704/270 |
| 2006/0206328 | A1 * | 9/2006 | Lukas .......................... 704/252 |
| 2007/0233488 | A1 * | 10/2007 | Carus et al. .................. 704/257 |
| 2008/0059186 | A1 * | 3/2008 | Mowatt et al. ............... 704/257 |

(Continued)

*Primary Examiner* — Eric Yen
(74) *Attorney, Agent, or Firm* — John L. Rogitz

(57) ABSTRACT

A television, or other device with television tuner, can be controlled to directly tune to a specific channel name, such as a broadcaster's station name, by using EPG metadata to provide a correlation between a channel number and channel name.

20 Claims, 3 Drawing Sheets

(56) References Cited

U.S. PATENT DOCUMENTS

| | | |
|---|---|---|
| 2008/0059188 A1* | 3/2008 | Konopka et al. ............... 704/257 |
| 2009/0099763 A1* | 4/2009 | Muramatsu et al. .......... 701/200 |
| 2009/0112592 A1* | 4/2009 | Candelore .................... 704/246 |
| 2009/0182562 A1* | 7/2009 | Caire et al. .................... 704/275 |
| 2010/0333163 A1* | 12/2010 | Daly ............................. 725/133 |
| 2011/0102683 A1* | 5/2011 | Josephs ......................... 348/731 |
| 2012/0035932 A1* | 2/2012 | Jitkoff et al. .................. 704/254 |
| 2013/0262125 A1* | 10/2013 | Tunstall-Pedoe .......... 704/270.1 |

* cited by examiner

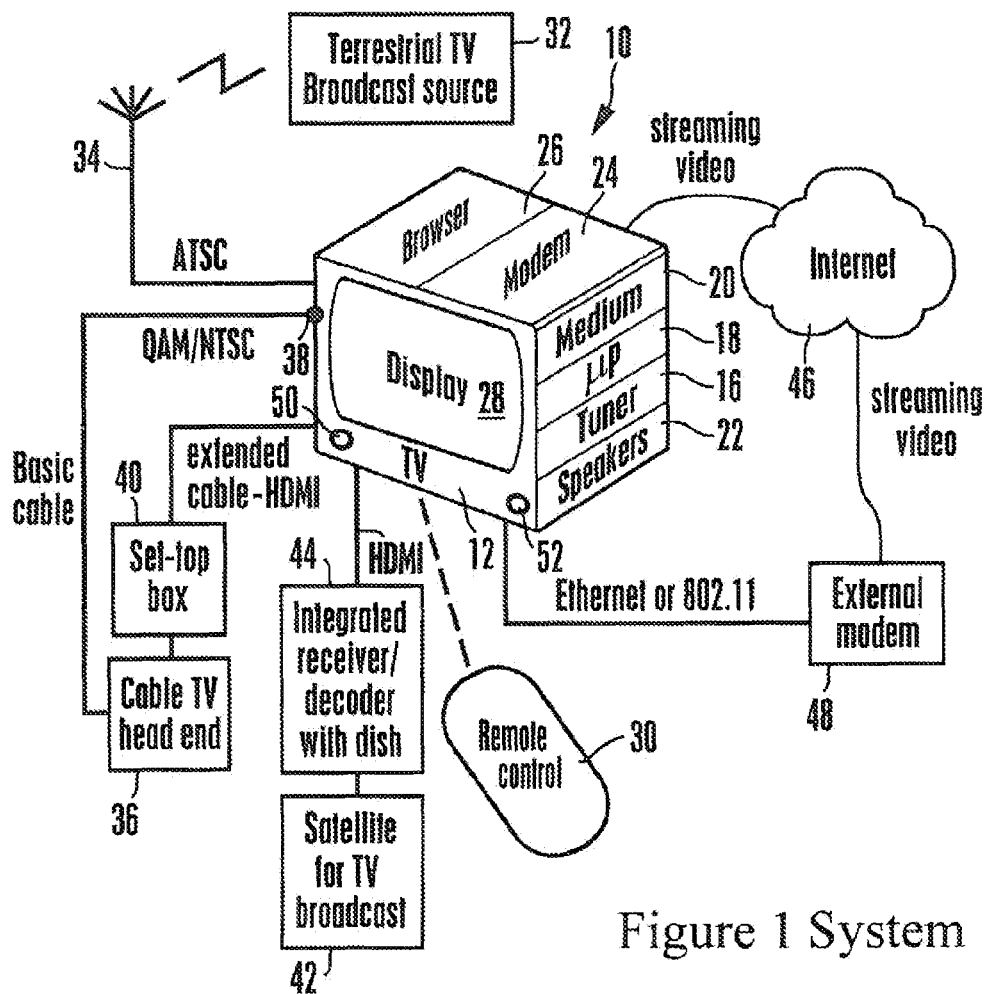
Figure 1 System
Figure 2 example remote control
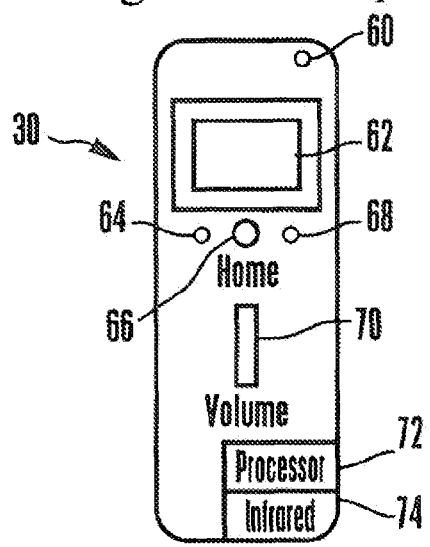

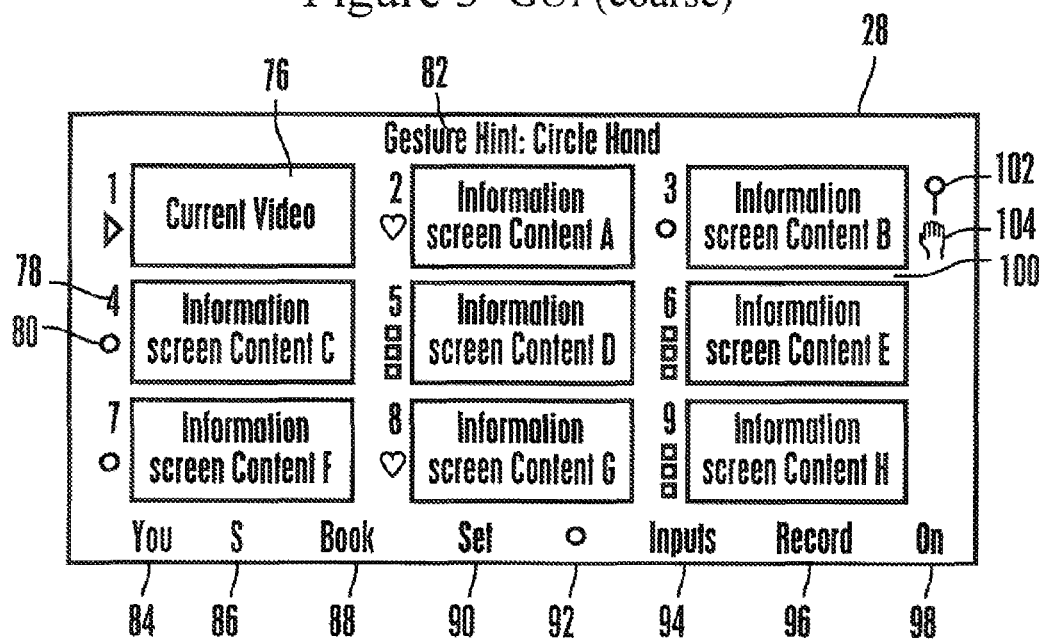
Figure 3 GUI (coarse)
Figure 4 GUI (fine)

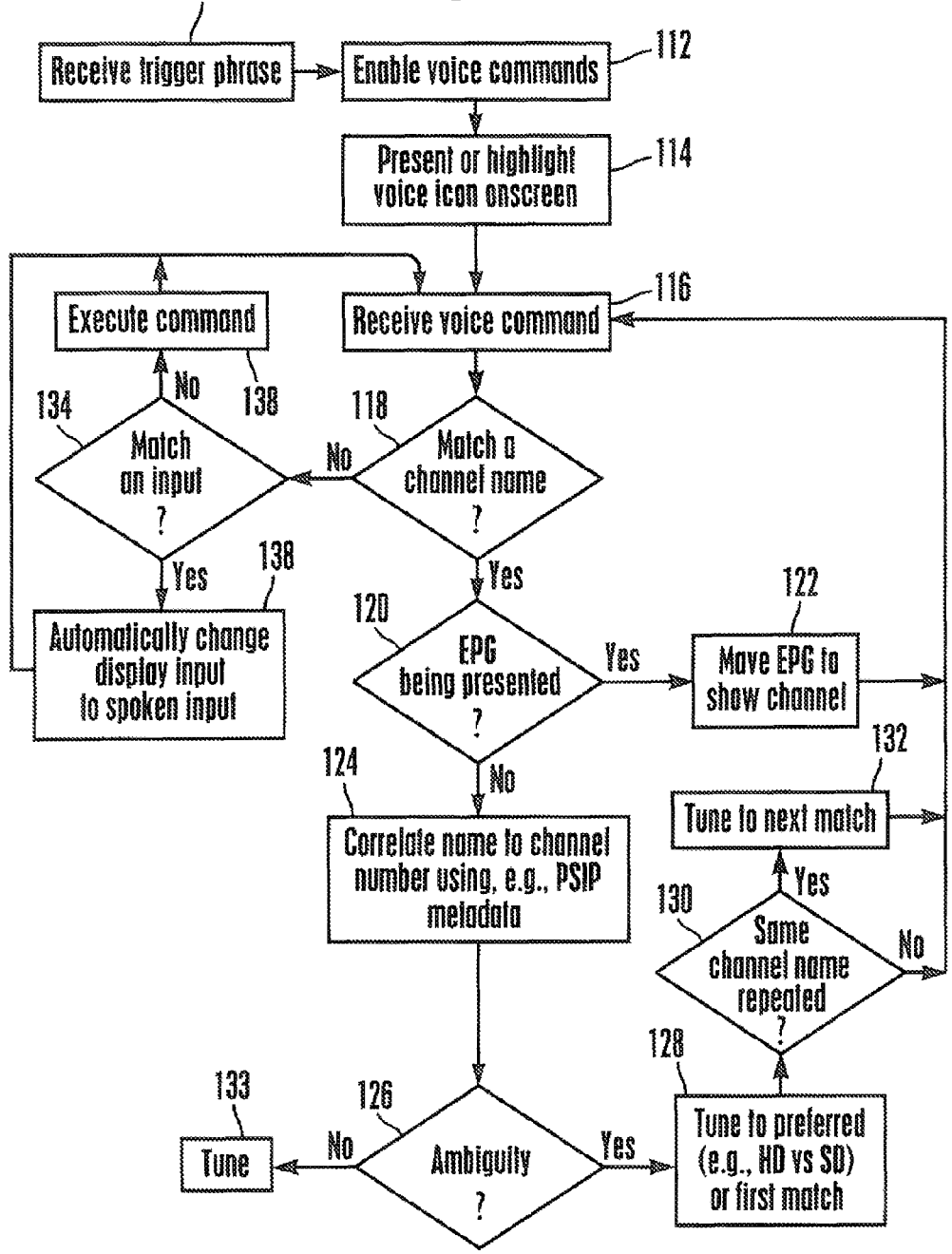

CONTROLLING AUDIO VIDEO DISPLAY DEVICE (AVDD) TUNING USING CHANNEL NAME

This application claims priority to U.S. provisional patent application Ser. No. 61/473,098, filed Apr. 7, 2011.

I. FIELD OF THE INVENTION

The present application relates generally to controlling audio video display devices (AVDD) such as TVs using channel name.

II. BACKGROUND OF THE INVENTION

To control TVs including to control which channel the TV is tuned to, a viewer typically manipulates a remote control (RC) to enters a desired channel number or presses up and down keys until a desired channel is tuned to. As understood herein, this requires the viewer to locate the RC and to know the desired channel number. This is inconvenient because the RC may not be immediately noticeable and because channel numbers are not as memorable to viewers as are channel names.

SUMMARY OF THE INVENTION

Accordingly, methods and apparatus are provided to enable a viewer of an AVDD who cannot easily remember channel numbers or find the correct remote control to control a television tuner by simply speaking a channel name to cause the AVDD to tune to the desired channel.

In one aspect, an audio video display device (AVDD) includes a processor, a video display presenting demanded images under control of the processor, and a computer readable storage medium bearing instructions executable by the processor to, responsive to detecting a trigger phrase spoken by a person, enable voice command control of the AVDD. The processor provides visible indication on the display that voice command control is enabled. The processor also receives a voice command from a person, determines if the voice command matches a channel name, and responsive to determining that the voice command matches a channel name, determines if an electronic program guide (EPG) is being presented on the display. The processor, responsive to determining that the EPG is being presented on the display, configures the EPG to present on the display metadata associated with the channel name. Also, responsive to determining that no EPG is being presented on the display, the processor determines if the channel name matching the voice command correlates to more than a single channel number and responsive to determining that the channel name correlates to only a single channel number, tunes the AVDD to the channel number correlated to the channel name. In contrast, responsive to determining that the channel name correlates to at least first and second channel numbers, the processor tunes to a predetermined preferred one of the first and second channel numbers.

If desired, responsive to a determination that the same channel name is repeated by a person plural times, the processor may cause the AVDD to tune to successive channel numbers correlated to the channel name. In some embodiments, responsive to a determination that the voice command does not match a channel name, the processor can determine if the voice command matches the name of an input device to the AVDD, and if so the processor can automatically configures the AVDD to present video from the input. The input can be represented by a spoken input source name and/or by a spoken input source task.

If example implementations the first channel number is the predetermined preferred one of the first and second channel numbers by virtue of being a high definition channel. In other implementations the first channel number is the predetermined preferred one of the first and second channel numbers by virtue of being the first channel number as between the first and second channel numbers on a channel list. In any case the channel name established by the voice command can be correlated to a channel number by accessing metadata carried in a television signal.

In another aspect, an audio video display device includes a processor, a video display presenting demanded images under control of the processor, and a computer readable storage medium bearing instructions executable by the processor to receive a voice command from a person and determine if the voice command matches a channel name. Responsive to determining that the voice command matches a channel name, the processor determines if the channel name correlates to at least a first channel number and a second channel number. Responsive to determining that the channel name correlates to at least the first and second channel numbers, the processor tunes to a predetermined preferred one of the first and second channel numbers.

In another aspect, a method includes, responsive to receiving an audible voice command, converting the voice command using speech recognition software to a computer-understandable voice command. The method also includes determining if the computer-understandable voice command matches a channel name and responsive to determining that the computer-understandable voice command matches a channel name, determining if the channel name correlates to at least first and second channel numbers. The first channel number is predefined to be preferred over the second channel number. Responsive to determining that the channel name correlates to at least first and second channel numbers, an audio video display device (AVDD) is tuned to the first channel number.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a plan view of an example remote control (RC) that may be used to control the graphical user interfaces (GUI) described herein, schematically showing the processor and wireless transceiver;

FIG. 3 is a screen shot of a nine panel GUI in a coarse mode suitable for gesture control;

FIG. 4 is a screen shot of a nine panel GUI in a fine mode suitable for RC control; and FIG. 5 is a flow chart of example voice command logic for controlling the AVDD using channel names.

DETAILED DESCRIPTION OF THE PREFERRED EMBODIMENT

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 18 which may execute a software-implemented browser 26. Video is presented under control of the TV processor 18 on a TV display 28 such as but not limited to a high definition TV (HDTV) flat panel display, and may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 18 to provide to the processor 18 video images of viewers looking at the display 28. Furthermore, a microphone 52 may be provided on the chassis or separate therefrom and can be electrically connected to the processor 18 to provide viewer-generated voice commands to the processor 18.

FIG. 2 shows that an example RC 30 may include a power on key 60 that can be toggled to energize and deenergize the AVDD 12. A touch-sensitive pad 62 may be provided against which a user can move his finger to correspondingly move a screen cursor on the display 28. Tapping the pad 62 can generate a "select" signal, it being understood that point-and-click devices other than the touch sensitive pad 62 may be used.

Also, a back key 64 may be provided to cause the display 28 to go back a screen shot, i.e., to present the screen shot immediately prior to the one being displayed when the back signal is generated, so as to enable a user to navigate through the various GUIs shown herein. A home key 66 may be provided to cause the below-described "home" GUI to be presented on the display 28, and an options key 68 may be provided to allow a user to cause a list of GUI options to be presented in the display 28. Volume output by the speakers 22 of the AVDD 12 can be controlled using a volume up/down rocker key 70. Manipulation of a key or the pad 62 on the RC 30 causes a respective signal to be sent to an RC processor 72 in the RC 30, which transmits the corresponding command to the AVDD 12 using a wireless transceiver 74 such as but not limited to an infrared transceiver. In addition, if desired four arrow keys may be arranged on the RC 30 to move a cursor up, down, left, and right on the display 28. Also, channel up/down keys may be provided as well as a microphone for voice input. A full QWERTY keyboard or keypad may be provided if desired. The touch pad 62 may be provided with a buzzer or other device to generate tactile feedback to the user.

FIGS. 3 and 4 show an example home GUI that may be presented on the display 28 of the AVDD 12. In the embodiment shown in FIG. 3, nine information panels arranged as shown in three rows of three panels each present visual content. The panels shown in FIG. 3 are of equal size with each other and are rectangular as shown. According to the embodiment shown in FIG. 3, the top left panel 76 of the GUI always shows the currently selected video content, typically either televised content from a selected TV channel or streaming video from a selected website. Information pertaining to available video content is presented in the other eight panels. This information typically includes a photograph or other image, a content source logo indicating the source of the content represented by the panel, and text typically describing the title of the content and other information.

As shown at 78, a numeral may be provided next to each panel, so that the panels may be numbered onscreen from one to nine as shown. This facilitates a user selecting to play video content from a panel by saying the numeral associated with the panel. Also, as shown at 80 a genre indicator may be presented next to each panel. The genre indicator may be an arrow in the case of the first panel 76 indicating that the first panel 76 is presenting the currently selected video. The genre indicator may be a heart (as shown in FIG. 3 for panel 2) indicating the underlying video content has been selected by the user as a "favorite". Other genre indicators may be presented respectively representing "history", meaning that the content associated with the panel had been presented previously, "recommended", meaning that the content associated with the panel is recommended by a recommendation engine executed by the AVDD processor 18, and so on, e.g., "frequently viewed", "promotional content". A user can select to present panels associated with content of only a single genre.

Additionally, if desired the GUI shown in FIG. 3 may present gesture hints 82, describing in text and/or animated hand motion a gesture and its associated command that the user may make, which can be captured by the camera 50 and correlated to the respective command by the processor 18 executing image recognition software. Thus, while viewer input may be afforded by making the display 28 a touch-sensitive display that a viewer can touch and thereby enter commands, present principles envision using viewer gestures in free space, i.e., gestures in which the viewer is distanced from the display 28 as would typically be the case for a TV viewer, with the viewer not touching the display but making gestures that are captured by the camera 50 and correlated to commands by the processor 18 executing image recognition software.

Further, a menu of selections may be presented as shown along the bottom of the GUI, including a "just for you" selector 84 to cause the GUI to contain panels with content personalized to a recognized user. A search selector 86 can be selected to cause a search for a user-input term to be executed. Also, a bookmark selector 88 can be selected to bookmark the currently playing video in panel 76 or to bookmark content in a panel over which the screen cursor is positioned.

Still referring to FIG. 3, a settings selector element 90 if selected causes a setting menus to be presented to control settings of the GUI. A queue selector element 92 may be presented to cause a list of enqueued programs to be presented on the display 28, and an inputs selector element 94 may be presented, selection of which causes a list of available input sources, e.g., "disk player, cable, satellite" to be presented on the display 28. A recommendations selector element 96 may be presented and if selected causes a list of recommended programming to be presented on the display 28. The list may be generated by a content recommendation engine such as the "Navi" engine made by Sony Corp. A "what's on" selector element 98 may be provided and if selected causes a list of current and future programs such as an electronic program guide (EPG) to be presented on the display 28. Indeed, an EPG may be presented in one of the panels shown in FIG. 3.

In any case, as mentioned above in the example shown the currently selected video content is always presented in the upper left panel 76 of the GUI. Should the user select another panel by using the RC 30 or by speaking the number of the panel or by the appropriate gesture captured by the camera 50, video content from the source associated with the selected panel automatically replaces the video content which was presented in the upper left panel 76 prior to receiving the new select signal. Indeed, should the user scroll the panels left or right to view additional content the upper left panel 76 remains unmoving as the other panels move on and off the display 28 as they are replaced by previously hidden content panels, with the upper left panel 76 always showing the currently selected video program.

The panel layout shown in FIG. 3 is somewhat coarse in that a visible border space 100 of many pixels width exists between adjacent panels as shown. Such a coarse representation facilitates control using gestures, although navigation by voice and by use of the RC 30 is always preferably enabled regardless of whether the GUI is in the coarse or fine view. FIG. 4 shows that if the user selects the fine view, the border space 100 disappears between adjacent panels, a view more suitable for RC control than gesture control although as stated above all three modes of command input (RC, voice, and gesture) remain enabled simultaneously with each other if desired.

Transition between the two views of FIGS. 3 and 4 may be effected by an appropriate hand gesture (e.g., a vertical motion of the hand) or by an appropriate voice command (e.g., "fine" or "coarse"), or by selecting, using the RC 30, "fine" or "course" from a settings menu accessed by selecting the settings selector element 90 or by pressing a key on the RC 30 or by simply grasping the RC, which is detected by the camera 50 and inferred by the processor 18 to correlate to a command to move to the "fine" screen of FIG. 4. The larger panels in the fine mode of FIG. 4 can be used to present more information than is presented in the panels of FIG. 3.

The GUI shown in FIGS. 3 and 4 may be removed from the screen and the currently playing video presented on the full display 28 by, e.g., toggling the home key on the RC 30. Voice command input may be enabled by voicing a phrase such as "hello TV", which is detected by the microphone 52 and using voice recognition software correlated by the processor 18 to a command to enable voice commands. Voice input may also be enabled using the RC 30 to select the "search" selector element 86. To indicate that voice commands are enabled, an icon such as an image of a microphone 102 can be presented on the display 28. Gesture command input may be enabled by waving the hand, which is detected by the camera 50 and using image recognition software correlated by the processor 18 to a command to enable gesture commands. To indicate that gesture commands are enabled, an icon such as an image of a hand 104 can be presented on the display 28.

Non-limiting examples of corresponding RC, voice, and gesture commands that accomplish the same tasks are:

| RC COMMAND | VOICE COMMAND | GESTURE |
|---|---|---|
| Channel up | "Channel up" | upward motion of hand |
| Channel down | "Channel down" | downward motion of hand |
| Volume decrease | "Quieter" | thumb down |
| Volume increase | "louder" | thumb up |

FIG. 5 shows example logic that may be executed by the processor 18 accessing instructions on the medium 20. It is to be understood that various decisions shown in FIG. 5 may be executed in a different order than shown, that FIG. 5 is shown in flow chart format for ease of exposition, and that actual logic employed by the processor 18 may be equivalently state logic. It is to be further understood that the processor 18 may execute the logic below to tune the TV tuner 16, or the tuner of, e.g., the STB 40, satellite receiver 44, as the case may be depending on which input source is providing video signals to the AVDD 12. Thus, "tune the AVDD" means configure the relevant tuner in the system because the system may have multiple tuners.

Turning now to FIG. 5, in one example embodiment to enable voice commands, a viewer speaks a trigger phrase such as "hello TV", which is detected by the microphone and received by the processor 18 at block 110, which converts the voice command to an equivalent electronic signal using voice recognition software principles known in the art. Or, the viewer can select to enable voice commands using on onscreen GUI.

In any case, control of the AVDD using voice commands may be enabled at block 112 responsive to the detection of the trigger phrase and if desired the icon 102 highlighted at block 114 to present a visible indication that voice commands are enabled. Subsequently, a voice command from a viewer is received by the AVDD at block 116 and converted using voice recognition software. For consistency, however, the voice command will be referred to as such even after conversion to an electronic signal.

Proceeding to decision diamond 118, it is determined whether the detected voice command matches a channel name, such as "ESPN". To this end, the processor 18 may, as an example, access program and system information protocol (PSIP) data received from a cable head end, satellite, terrestrial TV broadcast, etc. If the voice command matches a channel name, the logic moves to decision diamond 120 to determine if an electronic program guide (EPG) is being presented on the display 28, and if so the EPG is moved at block 122 to the spoken channel name, i.e., the EPG presents its list with the spoken channel name visible, typically at the top or bottom of the portion of the EPG channel list that is visible. In doing so the processor may simply match the voice command to channel names on the EPG and if multiple matches result, present the lowest channel number with a name matching the voice command.

On the other hand, if it is determined at decision diamond 120 that an EPG is not being presented on the display 28, the logic moves to block 124 to correlate the channel name established by the voice command to a channel number. In one embodiment this may be effected by looking up the channel name on the PSIP and correlating it to the associated channel number. Or, channel metadata may already be presented on the display 28, e.g., in the form of an EPG, in which case the processor matches the spoken channel name to a channel name in the displayed metadata and, hence, to a corresponding channel number.

Proceeding to decision diamond 124, if desired the processor 18 may determine if there is ambiguity in the channel name as can happen when the same content from a single provider associated with the channel name is presented on a high definition (HD) channel and a standard definition (SD) channel or when the same broadcaster is affiliated with multiple channels, e.g., ESPN1 and ESPN2. In the presence of ambiguity the logic may flow to block 128 to tune to a predetermined preferred channel, e.g., when both a HD channel associated with the spoken channel name and a SD channel associated with the spoken channel name exist, to tune automatically to the HD channel number. Or, the first channel number on, e.g., a list such as an EPG that matches the channel name may be tuned to.

In some implementations the logic next flows to decision diamond 130 to determine if the same channel name is spoken by the viewer, typically within a predetermined time period of receiving the first voice command stating the desired channel name. If a repeated channel name is received the logic can flow to block 132 to tune to the next channel number matching the spoken channel name. In this way, for example, a viewer can input the voice command "ESPN" and ESPN1 is tuned to, then if the viewer says "ESPN" again ESPN2 is tuned to, and so on.

Returning to decision diamond 126, if there is no ambiguity the channel number corresponding to the channel name of the voice command is tuned to at block 133.

Returning to decision diamond 118, if the spoken voice command does not match a channel name, the logic moves to decision diamond 134 to determine if the voice command matches the name of an input device to the AVDD, e.g., "HDMI1", "HDMI2", "Component 1", "BD Player", or "DVD player". If the voice command matches an input, the logic moves to block 136 to automatically change the display 28 input to be the input spoken by the viewer. Indeed, the processor 18 may also determine if the voice command is a device task that implicates an input such as "play a movie" or "play a game", in which case the processor 18 automatically changes the input from which video is presented on the display 28 to the source corresponding to the task, in the example above, to a disk player or game console, respectively.

Completing the description of FIG. 5, if the voice command does not match an input (or corresponding task) at decision diamond 134 the logic moves to block 138 to execute the command. For example, a voice command that does not match a channel name or an input may simply be a navigation or control command such as "volume up", volume down", etc., and the command is executed at block 138.

While the particular CONTROLLING AUDIO VIDEO DISPLAY DEVICE (AVDD) TUNING USING CHANNEL NAME is herein shown and described in detail, it is to be understood that the subject matter which is encompassed by the present invention is limited only by the claims.

What is claimed is:

1. An audio video display device (AVDD) comprising:
at least one processor configured to communicate with at least one video display;
at least one computer readable storage medium with instructions executable by the processor to configure the processor to:
enable voice command control of the AVDD;
receive a voice command from a person;
determine whether the voice command matches a channel name;
responsive to determining that the voice command matches a channel name;
configure an electronic program guide (EPG) to present on the display metadata associated with the channel name, or
tune the AVDD to the channel number correlated to the channel name; and
responsive to a determination that the voice command does not match a channel name, determine whether the voice command indicates an input device, the input device configured for communicating video content to the AVDD, and responsive to a determination that the voice command indicates an input device, automatically configure the AVDD to present video from the input device.

2. The AVDD of claim 1, wherein the instructions when executed by the processor configure the processor to, responsive to a determination that the same channel name is repeated by a person plural times, cause the AVDD to tune to successive channel numbers correlated to the channel name.

3. The AVDD of claim 1, wherein the voice command is determined to match an input source name.

4. The AVDD of claim 1, wherein the voice command is determined to match an input source task.

5. The AVDD of claim 1, wherein the first channel number is the predetermined preferred one of the first and second channel numbers by virtue of being a high definition channel.

6. The AVDD of claim 1, wherein the first channel number is the predetermined preferred one of the first and second channel numbers by virtue of being the first channel number as between the first and second channel numbers on a channel list.

7. The AVDD of claim 1, wherein the instructions when executed by the processor configure the processor to correlate a channel name established by a voice command to a channel number by accessing metadata carried in a television signal.

8. The AVDD of claim 1, wherein the instructions when executed by the processor configure the processor to:
responsive to determining that the voice command matches a channel name, determine whether an electronic program guide (EPG) is being presented on the display;
responsive to determining that the EPG is being presented on the display, configure the EPG to present on the display metadata associated with the channel name.

9. The AVDD of claim 8, wherein the instructions when executed by the processor configure the processor to:
responsive to determining that no EPG is being presented on the display, determine whether the channel name matching the voice command correlates to more than a single channel number;
responsive to determining that the channel name correlates to only a single channel number, tune the AVDD to the channel number correlated to the channel name; and
responsive to determining that the channel name correlates to at least first and second channel numbers, tune to a predetermined preferred one of the first and second channel numbers.

10. A device comprising:
- at least one non-transitory computer readable storage medium with instructions executable by at least one processor to configure the processor to:
- receive a voice command from a person;
- determine if the voice command matches a channel name;
- responsive to determining that the voice command matches a channel name, determine if the channel name correlates to at least a first channel number and a second channel number;
- responsive to determining that the channel name correlates to at least the first and second channel numbers, tune to a predetermined preferred one of the first and second channel numbers; and
- responsive to a determination that the voice command does not match a channel name, determine if the voice command indicates an input device, the input device configured for communicating with the AVDD, and responsive to a determination that the voice command indicates an input device communicating with the AVDD, automatically configure the AVDD to present video from the input device indicated by the voice command.

11. The device of claim 10, wherein the instructions when executed by the processor configure the processor to, responsive to detecting a trigger phrase spoken by a person, enable voice command control of the AVDD.

12. The device of claim 10, wherein the instructions when executed by the processor configure the processor to provide visible indication on the display indicating that voice command control is enabled.

13. The device of claim 10, wherein the instructions when executed by the processor configure the processor to:
- determine if an electronic program guide (EPG) is being presented on the display; and
- responsive to determining that the EPG is being presented on the display, configure the EPG to present on the display metadata associated with the channel name.

14. The device of claim 10, wherein the instructions when executed by the processor configure the processor to, responsive to a determination that the same channel name is repeated by a person plural times, cause the AVDD to tune to successive channel numbers correlated to the channel name.

15. The device of claim 10, wherein the command represents an input source name or an input source task or both an input source name and an input source task.

16. The device of claim 10, wherein the first channel number is the predetermined preferred one of the first and second channel numbers by virtue of being a high definition channel.

17. The device of claim 10, wherein the first channel number is the predetermined preferred one of the first and second channel numbers by virtue of being the first channel number as between the first and second channel numbers on a channel list.

18. Method comprising:
- responsive to receiving an audible voice command, converting the voice command using speech recognition software to a computer-understandable voice command;
- determining if the computer-understandable voice command matches a channel name;
- responsive to determining that the computer-understandable voice command matches a channel name,
- tuning an audio video display device (AVDD) to a channel number corresponding to the channel name, and responsive to determining that the voice command does not match a channel name, determining whether the voice command matches an input device, and responsive to a determination that the voice command indicates an input device the method automatically configures the AVDD to present video from the input device.

19. The method of claim 18, comprising, responsive to determining that an electronic program guide (EPG) is being presented on the AVDD when the voice command is received and that the computer-understandable voice command matches a channel name, configuring the EPG to automatically present visible metadata associated with the channel name.

20. The method of claim 18, comprising:
- responsive to determining that the computer-understandable voice command matches a channel name, determining if the channel name correlates to at least first and second channel numbers, the first channel number being predefined to be preferred over the second channel number; and
- responsive to determining that the channel name correlates to at least first and second channel numbers, tuning the AVDD to the first channel number.

* * * * *